(12) United States Patent
Tao

(10) Patent No.: US 6,243,481 B1
(45) Date of Patent: Jun. 5, 2001

(54) INFORMATION EMBEDDING AND RETRIEVAL METHOD AND APPARATUS

(75) Inventor: Bo Tao, Sunnyvale, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/309,739

(22) Filed: May 11, 1999

(51) Int. Cl.$^7$ ...................................................... G06K 9/00
(52) U.S. Cl. ........................... 382/100; 382/232; 375/265
(58) Field of Search .................................... 382/100, 232, 382/250; 380/54, 5, 210, 287; 375/130, 150, 240, 240.29, 243, 265, 341; 714/792, 793, 794; 371/37.7

(56) References Cited

U.S. PATENT DOCUMENTS

| | | | |
|---|---|---|---|
| 5,321,725 | * 6/1994 | Paik et al. ............................. | 375/39 |
| 5,721,788 | 2/1998 | Powell et al. ........................ | 382/100 |
| 5,809,160 | 9/1998 | Powell et al. ........................ | 382/100 |
| 6,055,272 | * 4/2000 | Kim ..................................... | 375/240 |
| 6,064,764 | * 5/2000 | Bhaskaran et al. .................. | 382/183 |
| 6,069,914 | * 5/2000 | Cox ..................................... | 375/150 |

OTHER PUBLICATIONS

Tao et al., "Adaptive Watermarking in the DCT Domain," Apr. 1997, Department of Electrical Engineering, Princeton University, Princeton, NJ.

Cox et al., "Secure Spread Spectrum Watermarking for Multimedia," NEC Research Institute, Princeton, NJ.

Swanson et al., "Data Hiding for Video–In–Video," 1997, Department of Electrical and Computer Engineering, University of Minnesota, Minneapolis, MN.

\* cited by examiner

Primary Examiner—Amelia M. Au
Assistant Examiner—Danny Do
(74) Attorney, Agent, or Firm—Wagner, Murabito & Hao LLP

(57) ABSTRACT

A method and system thereof for encoding and embedding information within digital data representing, for example, audio data, image data, and video data. The information is represented by a plurality of bits which are separated into a group of input bits and a group of pointer bits. One or more output bits are generated from an input bit using a convolutional code. A sequence of bits is selected using a pointer bit and the output bit(s). The information is encoded and embedded into the digital data by modifying coefficients of the digital data according to the sequence of bits selected. Each bit of the sequence of bits selected is used to modify a respective coefficient. In one embodiment, a coefficient is made into an even number when the bit has a first value and the coefficient is made into an odd number when the bit has a second value. In one embodiment, the digital data are in a compressed format. The digital data can be subsequently read to retrieve the embedded and encoded data, and the encoded sequence is then decoded and compared to the original watermark information.

15 Claims, 9 Drawing Sheets

FIGURE 5

INFORMATION EMBEDDING AND RETRIEVAL METHOD AND APPARATUS

BACKGROUND OF THE INVENTION

1. Field of the Invention

The present invention relates to the field of recorded digital media. More specifically, the present invention pertains to a method and apparatus for embedding hidden data or authenticity codes within digital data.

2. Background Art

Digital still cameras are growing in popularity as they become easier to use and as it becomes easier to archive the captured images on a computer system or memory device. However, the archived images are difficult to search and/or browse, especially when the database of captured images is large. In addition, the user may want information to be associated with each image, such as when and where the image was taken and the like. Currently, digital cameras either do not provide this type of information or have only limited capability to do so.

Digital media (such as digital videocassette recorders, digital video (or versatile) disc players, digital camcorders, digital still cameras and the like) make it possible to efficiently access, manipulate and reproduce digital data such as image data (including text) and video data as well as audio data (including speech). Digital media also make it possible to embed into the digital data supplementary information (e.g., hidden data or authenticity codes) that can be extracted automatically or in response to a user command. For example, the hidden data can be used to embed multiple speech streams into a video, each speech stream in a different language, so that the video can be distributed to a wide range of users who can then each view the video in the language of their choosing.

The hidden data are embedded directly into a selected subset of the pixels in a digital image frame; that is, the selected pixels are modified in order to store the hidden data. However, it is desirable that the embedded hidden data be undetectable by the human visual system. It is also desirable that the hidden data be easy to embed and retrieve, in particular in those cases where the amount of hidden data is relatively large. In addition, it is desirable that the hidden data be robust; that is, the hidden data should remain intact when the host data are compressed, stored, transmitted, manipulated, etc.

In some prior art data hiding schemes, a random sequence representing the data to be hidden is inserted into the digital data ("host data"); however, these schemes introduce a number of difficulties. First, because of its random nature, there are problems with detecting the hidden data. For example, the detection metrics have to be computed for each of the random sequences used in order to determine a statistically satisfactory match between any sequence detected in the host data and valid hidden data. However, for a reasonably large sequence, this computation can take a very long time to complete.

Second, in order for the random sequence to be robust against noise, it must be different enough from other valid hidden data. Accordingly, the distance between each new sequence and other sequences must be checked to make sure that the sequences are not too close to each other. If they are too close, a new sequence must be generated and tested again. Again, these computations can take a very long time to complete.

Another common prior art data hiding technique is to repeat the same sequence at several different locations in the host data. However, the resulting hidden data are not robust against noise. This is especially true when the number of repetitions is small.

Another significant disadvantage to the data hiding techniques described above and in other prior art data hiding techniques is that the host data are often significantly altered in order to facilitate retrieval of the hidden data. For example, the pixel value of the host data at each of the particular locations (e.g., a pixel) where the hidden data are being embedded needs to be increased or decreased by a significant percentage so that the hidden data will stand out. Consequently, surrounding pixels may also need to be changed so that the image is properly blended. This in turn limits the number and position of possible locations within the host data which can be altered without being detectable by the human visual system or without compromising the accuracy of the host data.

In summary, prior art techniques for embedding hidden data into digital data suffer from a number of disadvantages. The hidden data generated using the prior art techniques are not robust against noise and are difficult to embed and retrieve. The prior art techniques can require significant alteration of the host digital image data, and so the number and position of possible locations within the digital data for placing the hidden data are limited.

SUMMARY OF THE INVENTION

Accordingly, what is needed is a method and system for embedding hidden data into digital data so that the hidden data are robust against noise and are easy to embed and retrieve. In addition, what is needed is a system and method that satisfy the above needs and embed hidden data into the host digital data without significantly altering the host data, thereby permitting the hidden data to occupy a large number of positions.

The present invention includes a method and system thereof that satisfy the above needs. These and other advantages of the present invention not specifically mentioned above will become clear within discussions of the present invention presented herein.

The present invention pertains to a method and system thereof for invisibly encoding and embedding information within digital data representing, for example, audio data, image data, and video data. The present invention is well suited for storing a large amount of information while being robust against noise.

In the present embodiment, the information is represented by a plurality of bits which are separated into a group of input bits and a group of pointer bits. One or more output bits are generated from an input bit using a convolutional code. A sequence of bits is selected using a pointer bit and the output bit(s). The information is encoded and embedded into the digital data by modifying coefficients of the digital data according to the sequence of bits selected. Each bit of the sequence of bits selected is used to modify a respective coefficient. In one embodiment, a coefficient is made into an even number when the bit has a first value and the coefficient is made into an odd number when the bit has a second value. In one embodiment, the digital data are in a compressed format.

In one embodiment, the output bit(s) is/are used to point to a subgroup comprising a plurality of sequences of bits, and the pointer bit is used to select one of the sequences of bits from the plurality of sequences of bits.

In one embodiment, the present invention is implemented using a digital camera. In this embodiment, the present invention provides an apparatus for invisibly embedding information about an image (e.g., when and where the image was taken).

In one embodiment, the digital data are in a compressed format (e.g., JPEG or MPEG for image data, MP3 or AC3 for audio data, as well as other data compression formats).

The digital data can be subsequently read to retrieve the embedded and encoded data, and the encoded sequence is then decoded and made available to the user.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 illustrates an exemplary image frame containing digital data in accordance with the present invention.

DETAILED DESCRIPTION OF THE INVENTION

Figure 1A:
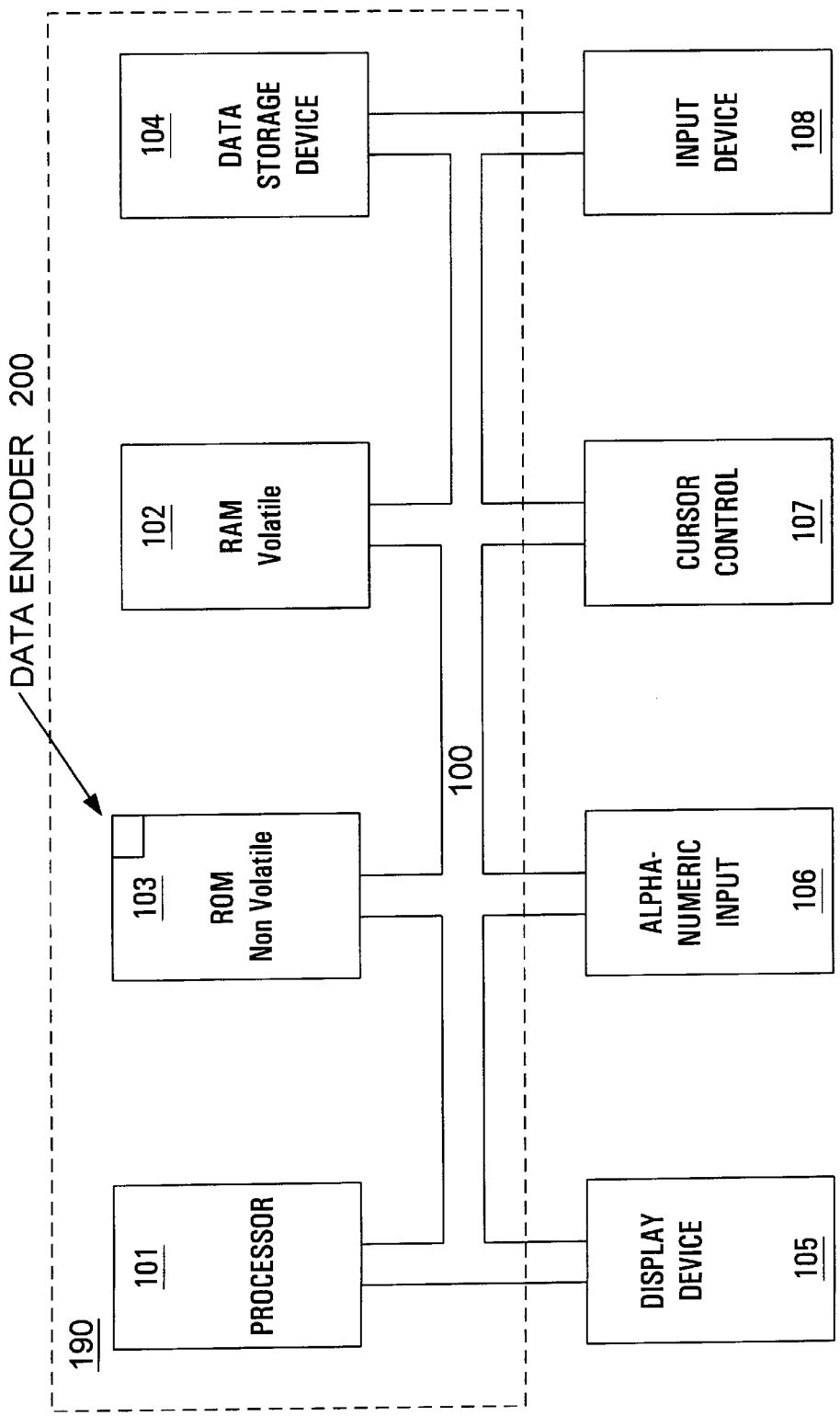
FIG. 1A is a block diagram of an exemplary computer system upon which embodiments of the present invention may be practiced.

In the following detailed description of the present invention, an information embedding and retrieval method and apparatus, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "generating" or "selecting" or "using" or "modifying" or "separating" or "reading" or the like, refer to the action and processes of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

The present invention pertains to a method and system thereof for encoding supplementary data ("hidden data") within digital data ("host data") representing, for example, still images (including text), video images, and audio (including speech). A portion of the host data is modified in accordance with the present invention in order to embed the hidden data in the host data. The hidden data are subsequently retrieved and then decoded. The present invention is well suited for storing a large amount of information while being robust against noise.

The hidden data are embedded into the host data such that the hidden data are not substantially perceptible by the human visual system. Thus, although the host data are modified to incorporate the hidden data, the hidden data and the changes to the host data may be invisible to the human visual system.

In the discussion herein, the present invention is described primarily in the context of a still image in the compressed data domain. However, it is understood that the present invention may be utilized with digital video data, audio data, and the like, and may be utilized in the uncompressed data domain.

In one embodiment, the present invention is used with digital image data captured using a digital camera. The present invention provides an apparatus for embedding information about a captured image into the image (e.g., when and where the image was taken).

Refer now to FIG. 1A which illustrates an exemplary computer system 190 upon which embodiments of the present invention may be practiced. In general, computer system 190 comprises bus 100 for communicating information, processor 101 coupled with bus 100 for processing information and instructions, random access memory 102 coupled with bus 100 for storing information and instructions for processor 101, read-only memory 103 coupled with bus 100 for storing static information and instructions for processor 101, data storage device 104 such as a magnetic or optical disk and disk drive coupled with bus 100 for storing information and instructions, a user output device such as display device 105 coupled to bus 100 for displaying information to the computer user, a user input device such as alphanumeric input device 106 including alphanumeric and function keys coupled to bus 100 for communicating information and command selections to processor 101, and a user input device such as cursor control device 107 coupled to bus 100 for communicating user input information and, command selections to processor 101. Input device 108 may be an optical character reader, a voice recognition system, or any other means for loading information and data into a memory unit of computer system 190.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
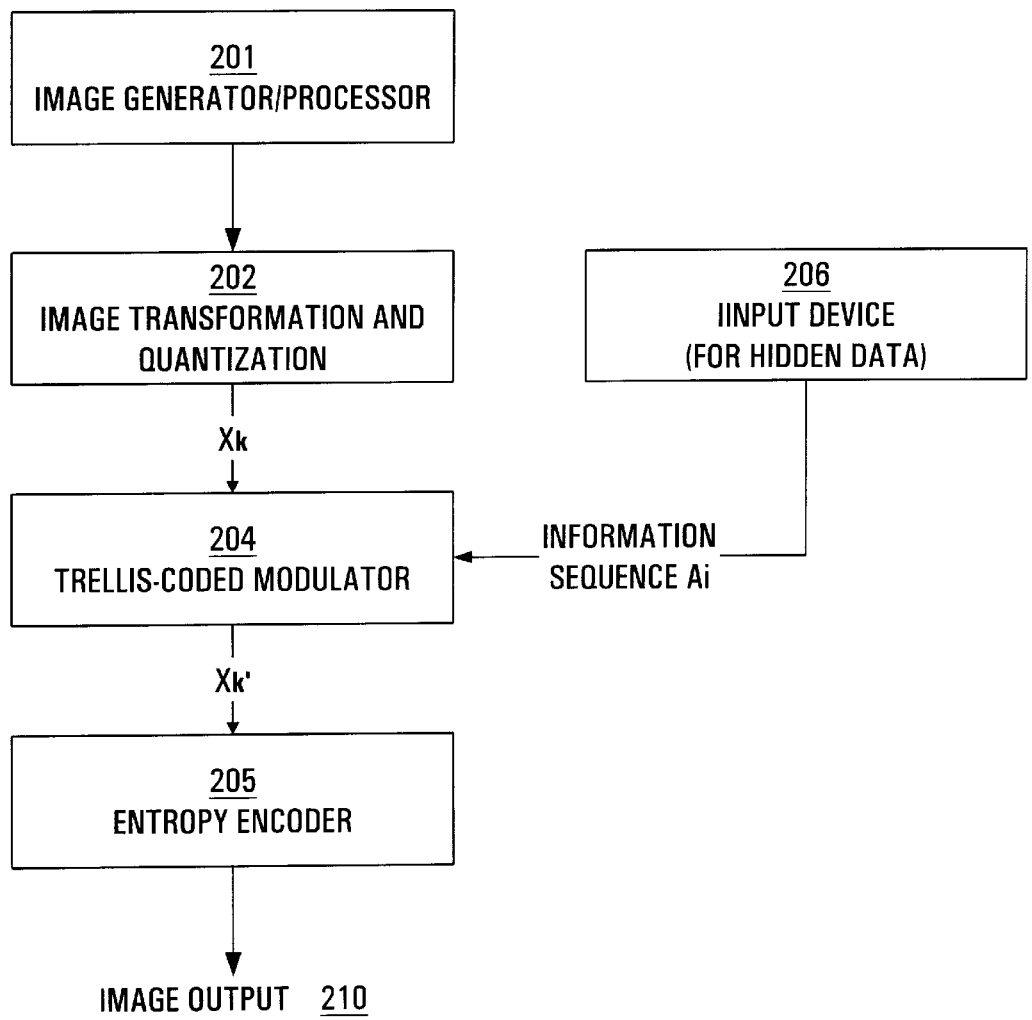
FIG. 2 is an illustration of an apparatus for hiding data in accordance with one embodiment of the present invention.

In the present embodiment, read-only memory 103 implements data encoder 200 for embedding hidden data into host data in accordance with the present invention (see FIG. 2).

Figure 1B:
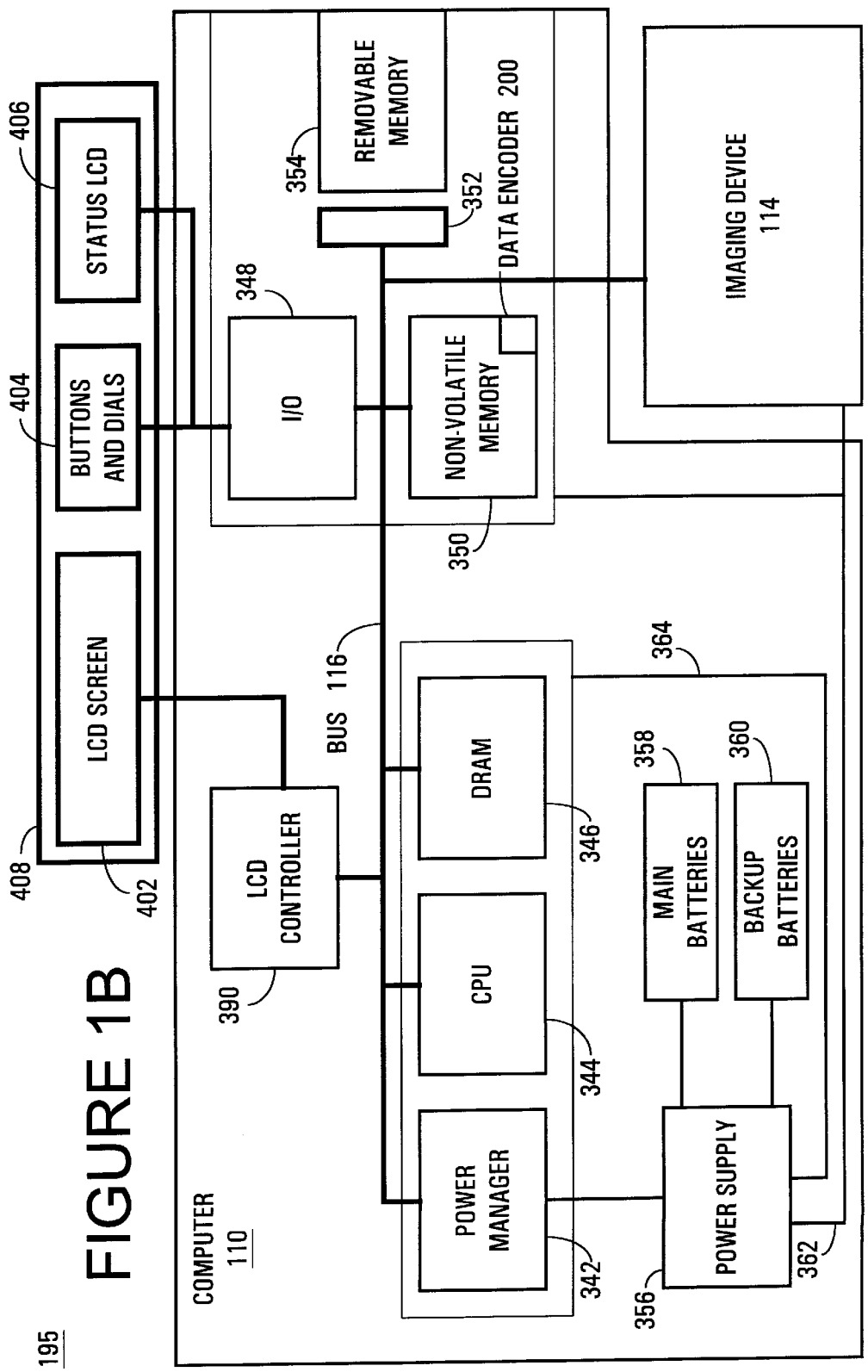
FIG. 1B is a block diagram of one embodiment of a digital camera in accordance with the present invention.

Referring now to FIG. 1B, a block diagram of one embodiment of digital camera 195 is shown for use in accordance with the present invention. Digital camera 195 preferably comprises imaging device 114, system bus 116 and computer 110. Imaging device 114 includes an image sensor, such as a charged coupled device (CCD) or a complementary metal-oxide semiconductor (CMOS) sensor, for generating a set of raw image data representing a captured image. In a preferred embodiment, system bus 116 provides connection paths between imaging device 114, optional power manager 342, central processing unit (CPU) 344, dynamic random-access memory (DRAM) 346, input/output interface (I/O) 348, non-volatile memory 350, and buffers/connector 352 that connect optional removable memory 354 to system bus 116. CPU 344 may include a conventional processor device for controlling the operation of digital camera 195.

Continuing with reference to FIG. 1B, I/O 348 is an interface device allowing communications to and from computer 110. For example, I/O 348 permits an external host computer (e.g., computer system 190 of FIG. 1A) to connect to and communicate with computer 110. I/O 348 also interfaces with a plurality of buttons and/or dials 404, and optional status liquid crystal display (LCD) 406, which in addition to LCD screen 402, are the hardware elements of the digital camera's user interface 408.

Non-volatile memory 350 stores a set of computer-readable program instructions to control the operation of digital camera 195. Non-volatile memory 350 implements data encoder 200 for embedding hidden data into host data in accordance with the present invention (see FIG. 2).

Removable memory 354 serves as an additional image data storage area and is preferably a non-volatile device that is readily removable and replaceable by the user of digital camera 195 via buffers/connector 352.

With reference still to FIG. 1B, power supply 356 supplies operating power to the various components of digital camera 195. Power manager 342 communicates via line 366 with power supply 356 and coordinates power management operations for digital camera 195. In the preferred embodiment, power supply 356 provides operating power to main power bus 362 and also to secondary power bus 364. Main power bus 362 provides power to imaging device 114, I/O 348, non-volatile memory 350 and removable memory 354. Secondary power bus 364 provides power to power manager 342, CPU 344 and DRAM 346.

Power supply 356 is connected to main batteries 358 and also to backup batteries 360. In the preferred embodiment, a user of digital camera 195 user may also connect power supply 356 to an external power source. During normal operation of power supply 356, main batteries 358 provide operating power to power supply 356 which then provides the operating power to digital camera 110 via both main power bus 362 and secondary power bus 364. During a power failure mode in which main batteries 358 have failed (when their output voltage has fallen below a minimum operational voltage level), backup batteries 360 provide operating power to power supply 356 which then provides the operating power only to secondary power bus 364 of digital camera 195.

DRAM 346 is a contiguous block of dynamic memory that may be selectively allocated for various storage functions. LCD controller 390 accesses DRAM 346 and transfers processed image data to LCD screen 402 for display.

FIG. 2 illustrates data encoder 200 implemented using computer system 190 (FIG. 1A) or digital camera 195 (FIG. 1B) in accordance with one embodiment of the present invention.

In one embodiment, the digital host data (e.g., still images including text, video images, or audio data) and the digital data to be hidden are compressed using the JPEG (Joint Photographic Experts Group) format. It is appreciated that the present invention may be utilized with other compression formats for image data such as MPEG (Moving Picture Experts Group). It is also appreciated that the present invention may be utilized with compression formats for other than image data (e.g., MP3 or AC3 for audio data).

Continuing with reference to FIG. 2, in the present embodiment, a digital image is generated in image generator/processor 201. In one embodiment, image generator/processor 201 processes charged coupled device (CCD) data, and performs known operations performed by a digital camera system such as analog-to-digital conversion, color processing, and white balancing.

Image transformation and quantization element 202 receives the digital image data and performs transformation and quantization operations to compress the digital image data using, for example, the known JPEG process. The output of Image transformation and quantization element 202 is a plurality of digital DCT (discrete cosine transform) coefficients X that represent the image data.

Input device 206 is for inputting the information that is to be embedded as hidden data into data encoder 200. Input device 206 may be a keyboard (such as alpha-numeric input 106 of FIG. 1A), an optical character reader, a voice recognition system, or any other input means. In one embodiment, the information can be alpha-numeric characters or it can be audio signals. It is appreciated that the information to be embedded may also be information that is stored in a memory unit of computer system 190 (FIG. 1A) or digital camera 195 (FIG. 1B).

The output of input device 206 is a digital representation of the information to be embedded (e.g., binary bits $A_i = A_0, \ldots, A_{M-1}$, where 'M' designates the number of bits to be embedded). Each of the bits $A_i$ is used as the basis for modifying a selected portion of the coefficients in order to embed the hidden data into image output 210. The coefficients to be modified are designated $X_k=X_0, \ldots, X_{N-1}$, where 'N' indicates the number of coefficients that are to be modified per image frame.

Trellis-coded modulator 204 decides which coefficients $X_k$ are to be modified based, for example, on user preferences. The coefficients selected for modification typically correspond to those locations in the image that are unobtrusive and will not be detectable by the human visual system. Various known methods for selecting the locations to be modified may be utilized in accordance with the present invention.

Trellis-coded modulator 204 also encodes the bits $A_0, \ldots, A_{M-1}$ from input device 206 to generate a string of encoded bits $B_k=B_0, \ldots, B_{N-1}$. Trellis-coded modulator 204 associates each coefficient $X_k=X_0, \ldots, X_{N-1}$ that is to be modified with a bit $B_k$. In accordance with the present invention, trellis-coded modulator 204 calculates resultant modified coefficients $X_k'=X'_0, \ldots, X'_{N-1}$ by modifying each selected coefficient $X_k$ according to the value of the associated $B_k$. Additional information is provided in conjunction with FIG. 3 and FIG. 8.

Continuing with reference to FIG. 2, entropy encoding of the digital image data containing modified coefficients $X_k'$ is performed in a known fashion using entropy encoder 205, and a digital image output 210 is generated which can be stored in the JPEG format (video is stored in the MPEG format, and audio is stored in the MP3 or AC3 format, for example). Thus, the hidden data are embedded in image output 210. The hidden data can be subsequently retrieved and decoded. Additional information is provided in conjunction with FIG. 6 and FIG. 7.

Figure 3:
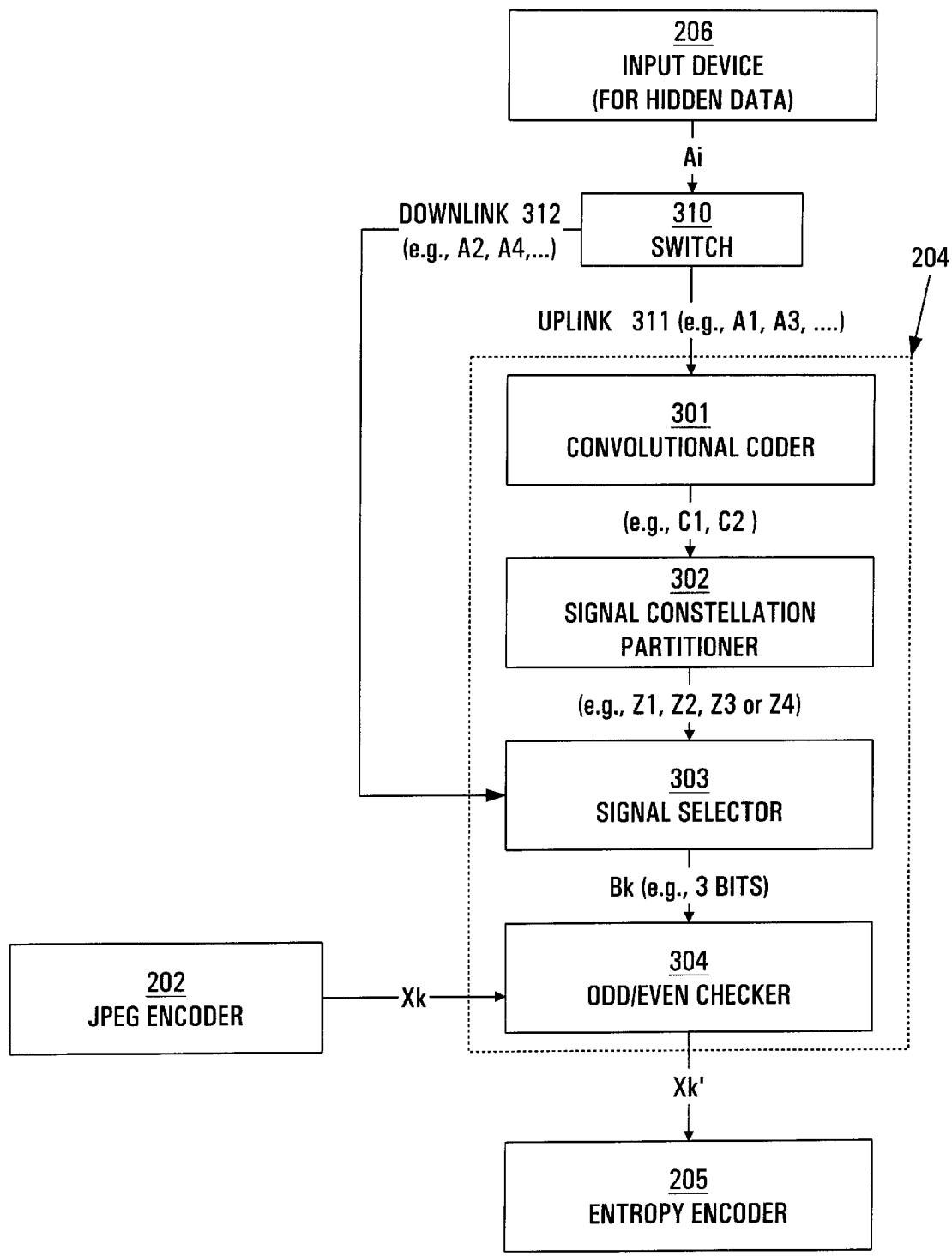
FIG. 3 is a data flow diagram of the data hiding apparatus of FIG. 2 in accordance with one embodiment of the present invention.

FIG. 3 illustrates the flow of data through trellis-coded modulator 204 (FIG. 2) in accordance with one embodiment of the present invention. As will be seen by the discussion below, even when the amount of hidden data is large, in accordance with the present invention the hidden data are quickly and readily encoded, retrieved and decoded.

The output of input device 206 is a digital representation of the information to be embedded (e.g., a sequence of binary bits $A_i=A_0, \ldots, A_{M-1}$). In the present embodiment, switch 310 separates the information sequence $A_i=A_0, \ldots, A_{M-1}$ into two groups. For example, in one implementation, the bits corresponding to even-numbered values of 'i' are separated into a first group, and the bits corresponding to odd-numbered values of 'i' are placed into a second group. One of the groups (e.g., the even-numbered group of information sequence $A_0, \ldots, A_{M-1}$) is forwarded via downlink 312 to signal selector 303. The other group (e.g., the odd-numbered group of information sequence $A_1, \ldots, A_{M-1}$) is forwarded via uplink 311 to convolutional coder 301 of trellis-coded modulator 204.

Convolutional coder 301 executes a convolutional code that is chosen based on the coding rate. The coding rate is a function of the number of bits in information sequence $A_0, \ldots, A_{M-1}$ and the number of positions in the host data that are to be modified; that is, the coding rate is equal to M/N. Various convolutional codes may be used in accordance with the present invention.

In the present embodiment, the coding rate is 2/3, and for each input bit to convolutional coder 301, there are two corresponding output bits C. For example, bit $A_1$ yields output bits $C_1$ and $C_2$. However, it is appreciated that the present invention is not limited to a convolutional code that produces two output bits for each input bit. In the present embodiment, signal constellation partitioner 302 uses output bits $C_1$ and $C_2$ to point to and select a particular subgroup of bits as shown in FIG. 4.

Figure 4:
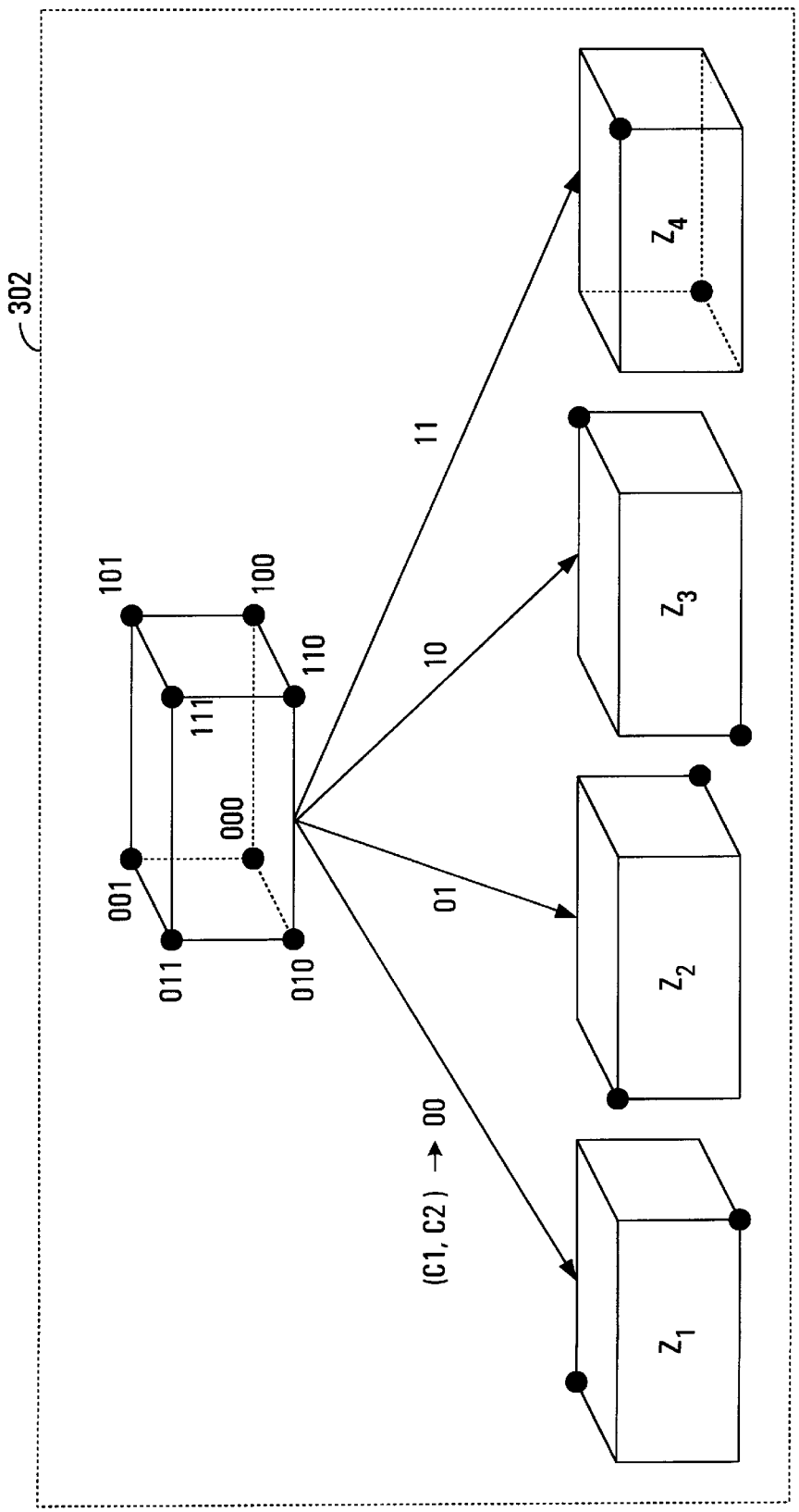
FIG. 4 is a diagram illustrating one embodiment of a partitioning process used by the signal constellation partition unit in accordance with the present invention.

With reference to FIG. 4, the partitioning process implemented by signal constellation partitioner 302 in accordance with the present invention is illustrated. In the present embodiment, the partitioning process is represented as a three-dimensional cube with edges of unit length. Each of the eight (8) vertices of the cube is specified by three (3) bits using the standard Cartesian coordinate system. The 8 vertices are divided into four (4) subgroups of two (2) vertices each; the subgroups are designated $Z_1, Z_2, Z_3$ and $Z_4$. Thus, in the present embodiment, each subgroup contains 2 sequences of 3 bits each. For example, subgroup $Z_1$ contains the bit sequences 001 and 110, subgroup $Z_2$ contains the bit sequences 011 and 100, subgroup $Z_3$ contains the bit sequences 010 and 101, and subgroup $Z_4$ contains the bit sequences 000 and 111.

In the present embodiment, the 2 vertices contained in each subgroup are those that lie on opposite corners of the cube, thereby maximizing the distance between them. Hence, for each bit in one of the sequences in a subgroup, the bit in the corresponding position in the other sequence in the subgroup has the opposite value (for example, when the first bit in one of the paired sequences is 0, the first bit in the other sequence is 1, etc.).

In accordance with the present invention, signal constellation partitioner 302 selects one of the subgroups based on the values of output bits $C_1$ and $C_2$. In the present embodiment, for example, when output bits $C_1$ and $C_2$ are each equal to 0, then subgroup $Z_1$ is selected.

With reference again to FIG. 3, signal selector 303 selects one of the 2 sequences of bits in a subgroup based on the information sequence bit $A_0, \ldots, A_{M-1}$ received via downlink 312 from input device 206. That is, after switch 310 separates the information sequence bits $A_0, \ldots, A_{M-1}$ into 2 groups of bits as described above, the bits from one group (the output bits) are used to select a subgroup Z, and the bits from the other group (the pointer bits) are used to select one of the 2 sequences of bits in the subgroup Z selected. For example, if subgroup $Z_1$ is selected based on $A_1$ (actually, the $C_1$ and $C_2$ that were determined as a function of $A_1$) and if pointer bit $A_2$ is 0, then 001 is selected from subgroup $Z_1$, and if pointer bit $A_2$ is 1, then 110 is selected.

Note that the bits in information sequence $A_0, \ldots, A_{M-1}$ are provided sequentially to trellis-coded modulator 204 and signal selector 303 by uplink 311 and downlink 312, respectively. Thus, for example, first input bit $A_1$ is used to determine corresponding values of output bits $C_1$ and $C_2$, and $C_1$ and $C_2$ are used to select a subgroup Z. Concurrently, first pointer bit $A_2$ is used to select a sequence of bits from the subgroup Z that is selected. Then, input bit $A_3$ is used to determine the next set of values of output bits $C_1$ and $C_2$, and these values of output bits $C_1$ and $C_2$ are used to select another subgroup Z (which may be the same or different from the first subgroup selected depending on the values of $C_1$ and $C_2$), and input bit $A_4$ is used to select a sequence of bits from the subgroup Z that is selected. This process continues for each $A_0, \ldots, A_{M-1}$. Thus, a plurality of sequences of bits are selected. The selected sequences of bits are assembled into a single string of bits $B_0, \ldots, B_{N-1}$; that is, the output of signal selector 303 is a sequence of bits $B_0, \ldots, B_{N-1}$. Thus, in accordance with the present invention, information sequence $A_0, \ldots, A_{M-1}$ is mapped to a longer sequence of bits $B_0, \ldots, B_{N-1}$, where 'N' is greater than 'M'.

As noted in conjunction with FIG. 2, trellis-coded modulator 204 decides which coefficients $X_k=X_0, \ldots, X_{N-1}$ are to be modified. With reference to FIG. 3, odd/even checker 304 associates each $B_k$ with an $X_k$. In the broadest sense, each of the bits $B_0, \ldots, B_{N-1}$ is applied to 'N' of the coefficients X in the digital data; that is, trellis-coded modulator 204 associates each $B_k$ with an $X_k$. The value of $X_k$ is modified according to the value of the associated $B_k$ to determine a modified coefficient $X_k'$.

In the present embodiment, $X_k'$ is determined by applying the following translate conditions:

$X_k'=X_k+1$ if $B_k=0$ and $X_k$ is an even number;
$X_k'=X_k$ if $B_k=0$ and $X_k$ is an odd number;
$X_k'=X_k$ if $B_k=1$ and $X_k$ is an even number; and
$X_k'=X_k+1$ if $B_k=1$ and $X_k$ is an odd number.

Thus, in the present embodiment, if $B_k=0$, then $X_k'$ is always an odd number, and if $B_k=1$, then $X_k'$ is always an even number. It is appreciated that other translate conditions may be utilized in accordance with the present invention to determine $X_k'$.

The present invention only alters the digital data by a slight amount and so the result is not substantially detectable by the human visual system even when a large number of coefficients (representing a large number of positions in the image) are modified.

Figure 5:
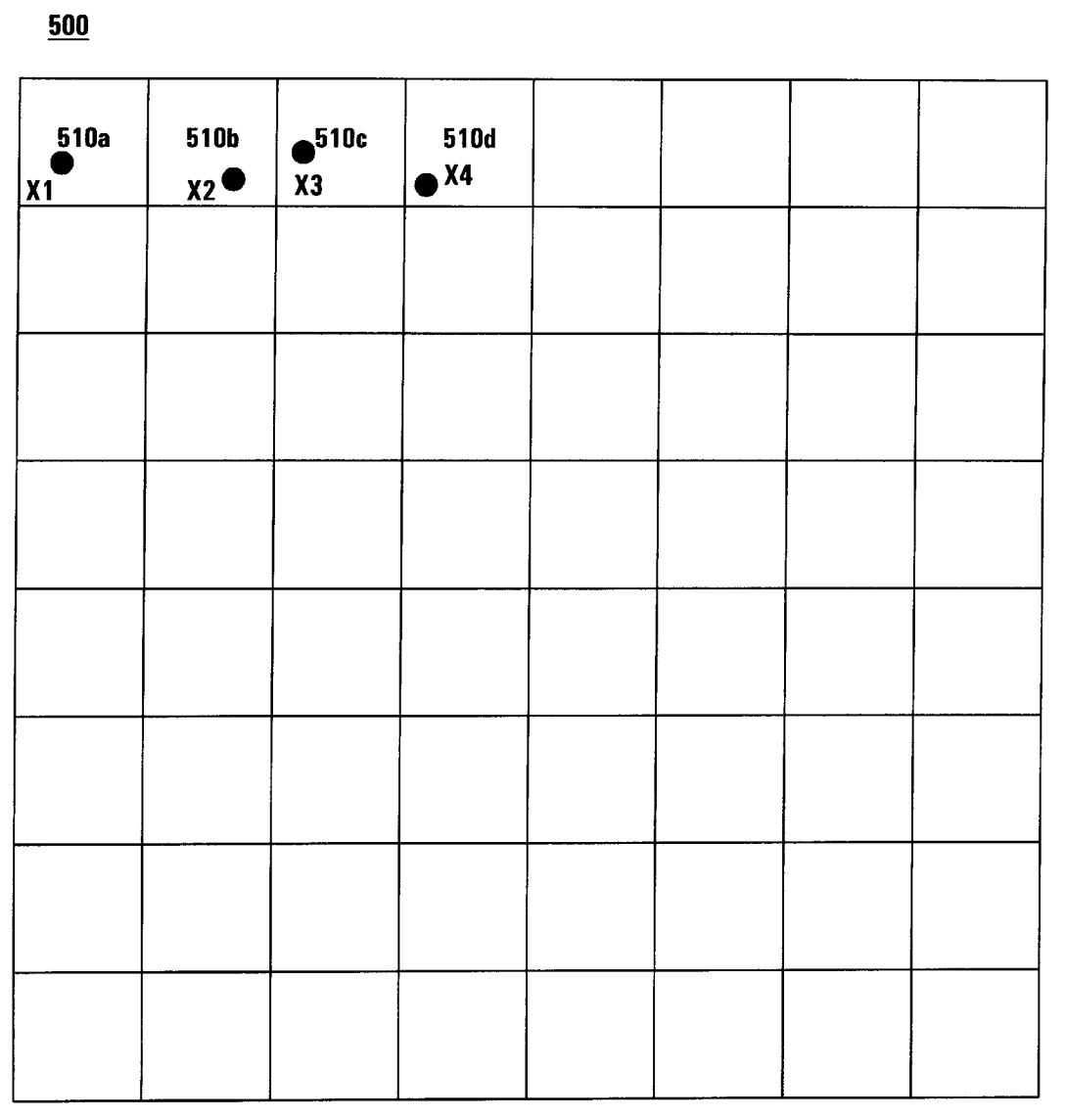

Refer now to FIG. 5, which represents an exemplary image frame 500 containing host data into which hidden data are embedded in accordance with the present invention. It is appreciated that image frame 500 may represent a still image, or it may represent one frame of a video image comprising multiple frames.

In the JPEG format, an image frame, for example, has dimensions of 512 pixels by 512 pixels arranged in 8 by 8 blocks. Thus, this exemplary JPEG image contains 64 by 64 blocks of pixels (4096 blocks). For simplicity of illustration, image frame 500 includes fewer than 4096 blocks typified by blocks 510a, 511b, 510c and 510d.

In the present embodiment, a coefficient (e.g., $X_1$, $X_2$, $X_3$ and $X_4$) within each block 510a–d is identified as a location which can be modified in order to embed the hidden data. The locations which are to be modified within each block may be located at any position within the block; it is not necessary for the same location to be modified in each block 510a–d. It is appreciated that more than one location may be modified in each block. In addition, it is not necessary for a location to be modified in every block; for example, depending on the value of M (see discussion pertaining to FIG. 3), perhaps only every third block contains a location which is modified. In the present embodiment, the coefficients $X_1$, $X_2$, $X_3$ and $X_4$ are selected by trellis-coded modulator 204 (FIG. 2) and correspond to a location in blocks 510a–d that are unobtrusive and will not be detectable by the human visual system. In accordance with the present invention, each of the coefficients $X_1$, $X_2$, $X_3$ and $X_4$ (or a subset thereof) are modified according to the value of the associated bit $B_k$ as described in conjunction with FIG. 3.

Thus, in accordance with the present invention, the hidden data are readily encoded and are robust against noise. The hidden data are embedded into the digital host data without significantly altering the host data, thereby permitting the hidden data to occupy a large number of positions in the host data without being substantially detectable by the human visual system. The present invention permits relatively large amounts of hidden data to be embedded.

As will be seen by the discussion below, embodiments of the present invention also facilitate the process for retrieving the hidden data. In accordance with the present invention, it is only necessary to determine whether the $X_k'$ coefficients are even or odd, because from that information it is directly determined whether the value of each $B_k$ is equal to 0 or 1. Once the value of each $B_k$ is known, the retrieval and decoding process is performed.

Figure 6:
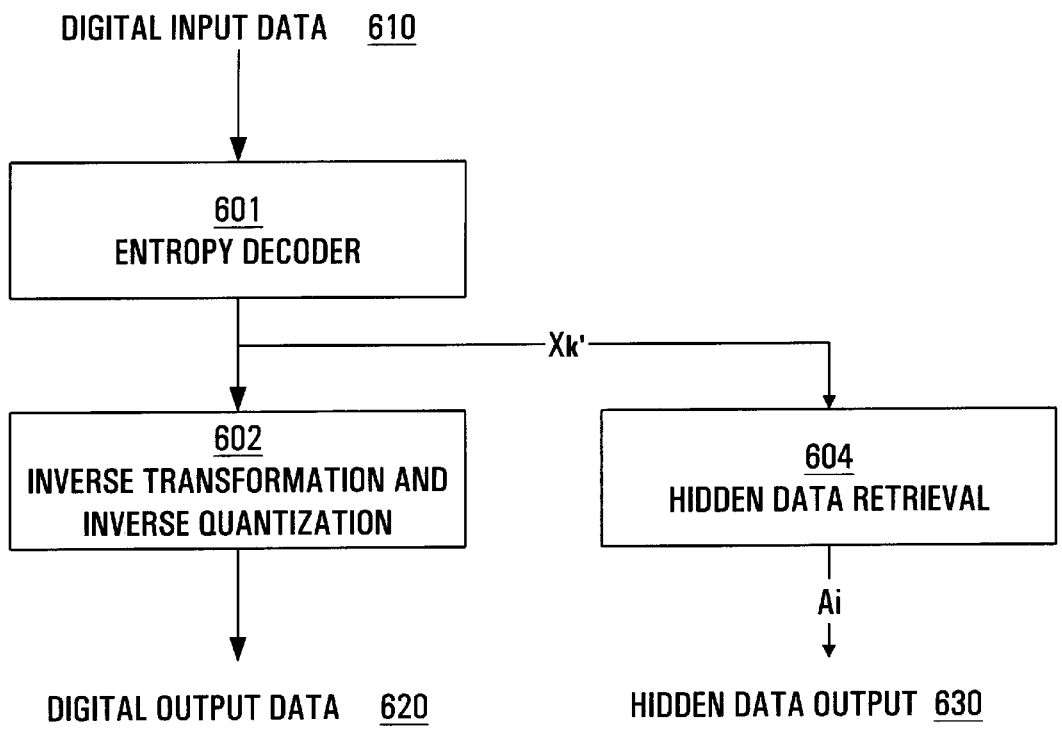
FIG. 6 illustrates an apparatus for retrieving hidden data in accordance with one embodiment of the present invention.

FIG. 6 illustrates apparatus 600 implemented using computer system 190 (FIG. 1A) or digital camera 195 (FIG. 1B) to retrieve and decode hidden data in accordance with one embodiment of the present invention. In one embodiment, apparatus 600 is a digital camera playback system that provides an apparatus for retrieving information about a captured image from the image (e.g., when and where the image was taken).

In one embodiment, digital data input 610 is in the compressed domain (e.g., JPEG for still images, MPEG for video). It is appreciated that the digital input data may also represent compressed audio data (e.g., MP3 or AC3). Hidden data are embedded in digital data input 610 in accordance with the present invention as described in conjunction with FIGS. 2 and 3; that is, digital data input 610 contains modified coefficients $X_k'=X'_0, \ldots, X'_{N-1}$ that are either even or odd to represent the hidden data.

With reference still to FIG. 6, digital data input 610 is entropy decoded in a known manner by entropy decoder 601. The output of entropy decoder 601 includes modified DCT coefficients $X_k'=X_0, \ldots, X_{N-1}$. The coefficients that were modified to incorporate the hidden data are known; entropy decoder 601 uses the same locations as those specified by trellis-coded modulator 204 (FIGS. 2 and 3). The values of the modified coefficients $X_k'$ are read and thus whether the coefficient is even or odd is readily determined. In accordance with the present invention, the corresponding values of $B_k=B_0, \ldots, B_{N-1}$ are also readily determined. In the present embodiment, if $X_k'$ is an odd number, then $B_k=0$, and if $X_k'$ is an even number, then $B_k=1$.

Continuing with reference to FIG. 6, hidden data retrieval unit 604 uses a convolutional code to decode the hidden data. In the present embodiment, the convolutional code is analogous to that implemented by convolutional coder 301 of FIG. 3. The output of hidden data retrieval unit 604 is the decoded hidden data $A_i=A_0, \ldots, A_{M-1}$.

Inverse transformation and inverse quantization element 602 performs inverse transformation and quantization functions, such as those of a JPEG decoder.

Figure 7:
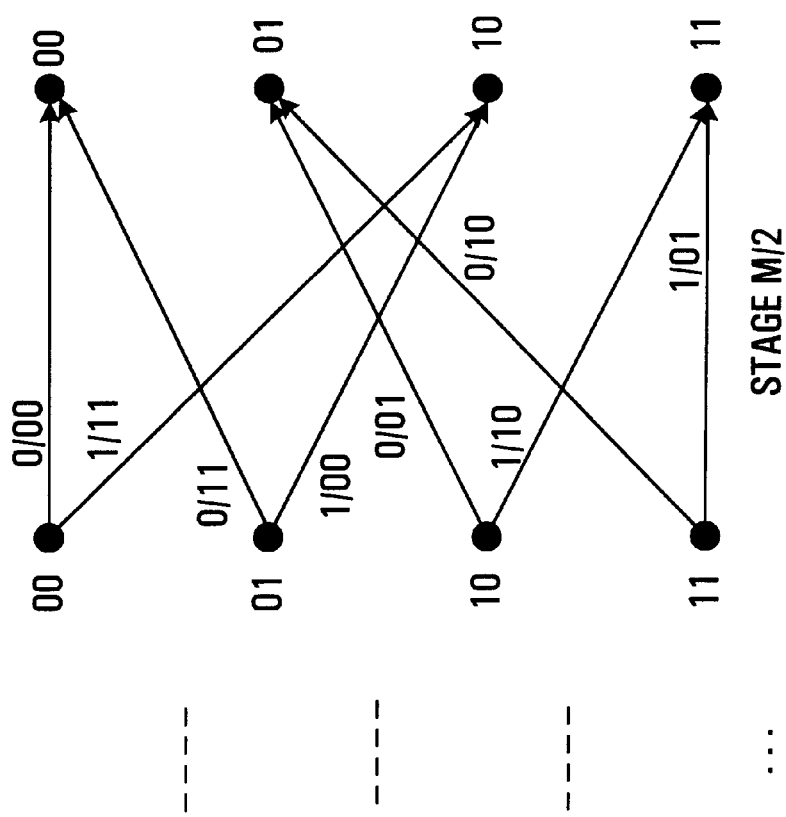
FIG. 7 illustrates one embodiment of the methodology for decoding hidden data in accordance with the present invention.
Figure 7:
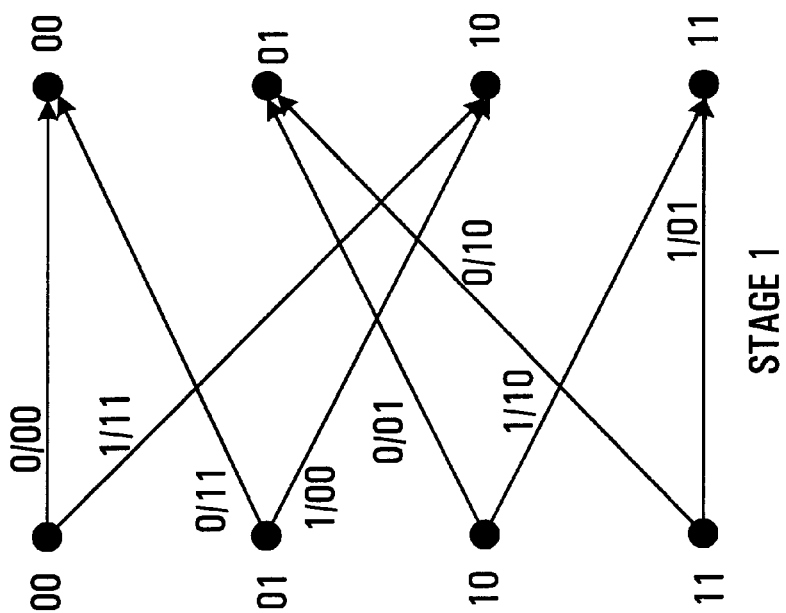

FIG. 7 exemplifies trellis 700 specified by convolutional coder utilized by hidden data retrieval unit 604 (FIG. 6) in order to decode the hidden data in accordance with one embodiment of the present invention. Each arrow of trellis 700 is associated with a set of bits '$B_k$/bc' (e.g., 0/00). The first bit in the set of bits (e.g., $B_k$) is the input to the convolutional code, while the bits 'b' and 'c' are the corresponding decoded output bit from the convolutional code. Each of the bits $B_k$ derived from the hidden (embedded) data sequence are input to trellis 700 and is associated with a single unique path through trellis 700. To decode the path, various techniques known in the art may be used, such as the Viterbi process.

Figure 8:
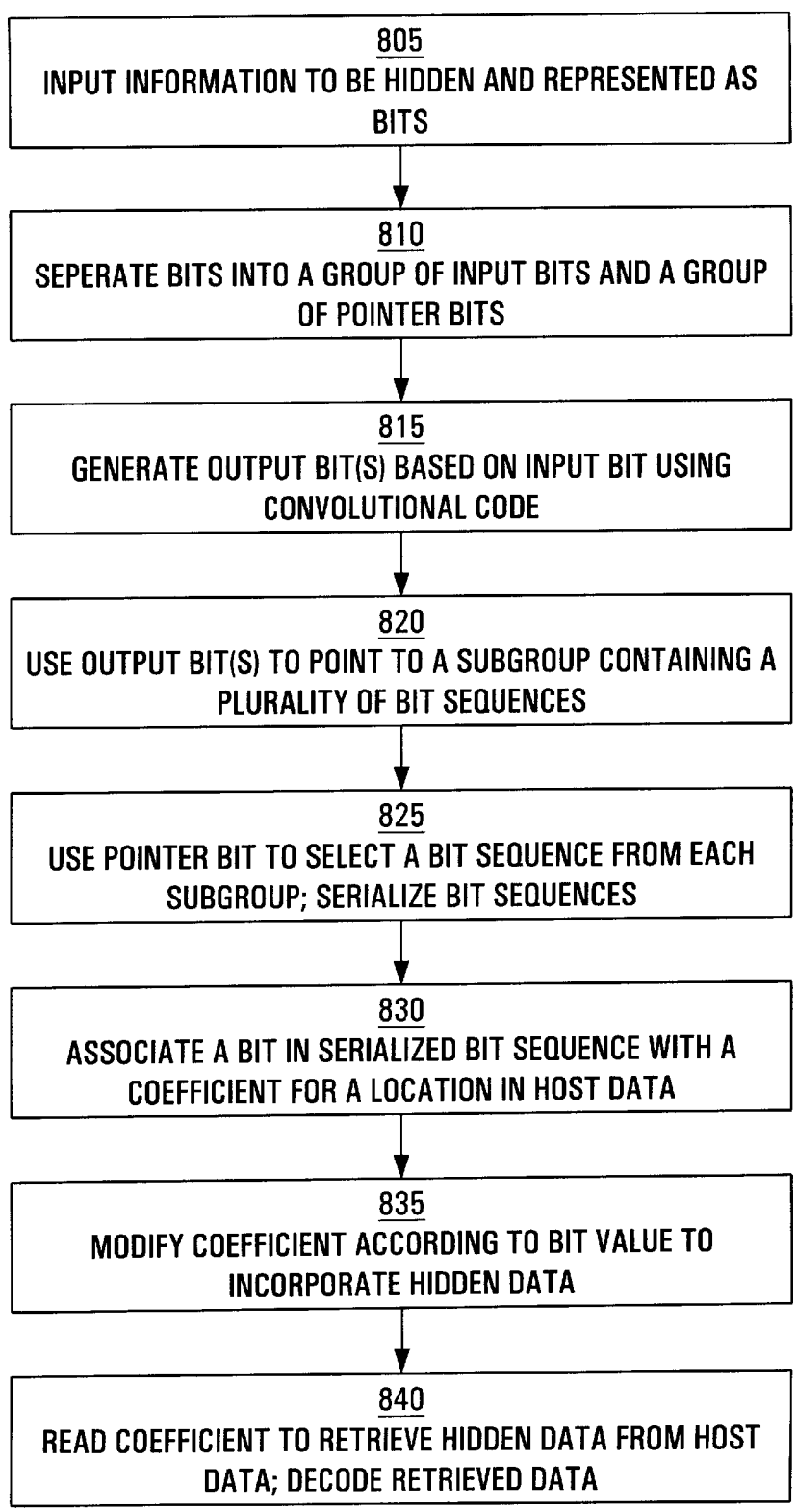
FIG. 8 is a flowchart of the process for encoding and embedding hidden data within digital data in accordance with one embodiment of the present invention.

FIG. 8 is a flowchart of process 800 used to encode, embed and retrieve hidden data in accordance with one embodiment of the present invention. Process 800 is implemented using computer-readable program instructions executed by processor 101 of computer system 190 (FIG. 1A) or CPU 344 of digital camera 195 (FIG. 1B).

In step 805 of FIG. 8, the information to be hidden is input into process 800 using, for example, an optical character reader, a keyboard, a voice recognition system, or other input means. The information to be hidden may represent audio, image or video image. The information to be hidden is digitized by input device 108 and consequently is represented as a sequence of binary characters (e.g., bits $A_0, \ldots, A_i$, where 'i' represents the number of bits in the information to be hidden).

In step 810 of FIG. 8, the sequence of bits $A_i=A_0, \ldots, A_{M-1}$ from step 805 are separated into a first group of bits ("input bits") and a second group of bits ("pointer bits") using switch 310 (FIG. 3). In the present embodiment, the first and second groups of bits each contain the same number of bits. In the present embodiment, when 'i' is an odd number, the associated bit is placed in the first group of bits, and when 'i' is an even number, the associated bit is placed in the second group of bits.

In step 815, in the present embodiment, an input bit from step 810 is input into a convolutional code. Various convolutional codes may be used in accordance with the present invention. In the present embodiment, for each input bit $A_i$, the output of the convolutional code is two output bits $C_1$ and $C_2$; however, it is appreciated that, in other embodiments, other convolutional codes may be used and the number of bits in the output may be different than two. In the present embodiment, step 815 is performed for each input bit, and thus there are two output bits associated with each input bit.

In step 820, each of the pairs of output bits $C_1$ and $C_2$ determined in step 815 are used to point to a particular subgroup Z containing a plurality of bit sequences. In the present embodiment, there are four such subgroups, each containing two bit sequences of three bits each. In the present embodiment, each possible pair combination of output bits $C_1$ and $C_2$ points to a single subgroup; that is, each subgroup is uniquely identified by a combination of two bits. Thus, each pair of output bits $C_1$ and $C_2$ from step 815 is used to select one of the subgroups. In the present embodiment, step 820 is repeated for each pair of output bits $C_1$ and $C_2$. Accordingly, at this point in process 800, each input bit from step 810 is associated with two three-bit sequences.

In step 825 of FIG. 8, for each subgroup Z selected in step 820, a pointer bit from step 810 is used to select one of the two three-bit sequences contained in that subgroup. The pointer bit is a binary value and so one of the three-bit sequences is selected if the pointer bit is equal to zero, and the other three-bit sequence is selected if the pointer bit is equal to one. In the present embodiment, step 825 is repeated for each pointer bit. Thus, at this point in process 800, each input bit and each pointer bit associated with a bit sequence of three bits.

In the present embodiment, the bit sequences are then serialized to form a single string of bits (e.g., bits $B_k = B_0, \ldots, B_{N-1}$, where 'N' is greater than 'M'). The string of bits $B_0, \ldots, B_{N-1}$ represents an encoded version of the information to be hidden (e.g., bits $A_0, \ldots, A_{M-1}$).

In step 830 of FIG. 8, each bit $B_k$ is associated with a coefficient (e.g., $X_k = X_0, \ldots, X_{N-1}$) representing a position in the host data that is to be modified.

In step 835, each coefficient $X_k$ is modified according to the value (either 0 or 1) of the associated bit $B_k$ as described above in conjunction with FIG. 3. In the present embodiment, when $B_k$ is equal to one value, then $X_k$ is made to be even, and when $B_k$ is equal to its other value, then $X_k$ is made to be odd. The hidden data are thereby incorporated into the host data by means of the modified coefficients $X_k' = X'_0, \ldots, X'_{N-1}$.

In step 840, the hidden data are retrieved and decoded. In the present embodiment, the modified coefficients $X_k'$ are read and their value (odd or even) is determined. The value of each of the bits of encoded hidden data (e.g., $B_k$) associated with each modified coefficient $X_k'$ is readily determined based on whether the modified coefficient is odd or even. For example, in the present embodiment, if the modified coefficient $X_k'$ is odd, then the associated $B_k$ is 0, and if the modified coefficient $X_k'$ is even, the associated $B_k$ is 1. In the present embodiment, the sequence of bits $B_k$ is then decoded using the convolutional code of step 815. Additional information regarding the decoding methodology is provided in conjunction with FIG. 7.

Thus, the present invention provides a method and system thereof for encoding and embedding hidden data into digital data representing, for example, still images (including text), video images, and audio (including speech). The hidden data generated in accordance with the present invention are robust against noise, and are easy to encode, detect, retrieve and decode. The hidden data are embedded into the host data without significantly altering the host data, thereby permitting the hidden data to occupy a large number of positions in the host data without being detectable by the human visual system. The present invention permits relatively large amounts of hidden data to be encoded.

The preferred embodiment of the present invention, an information embedding and retrieval method and apparatus, is thus described. While the present invention has been described in particular embodiments, it should be appreciated that the present invention should not be construed as limited by such embodiments, but rather construed according to the below claims.

What is claimed is:

1. A method for encoding and embedding information within digital data, said method comprising the steps of:
   a) separating a plurality of bits representing information to be embedded into a first group of input bits and a second group of pointer bits according to a predetermined scheme wherein each pointer bit in said second group is associated with a respective input bit in said first group;
   b) generating one or more output bits from an input bit using a convolutional code;
   c) selecting a sequence of bits using a combination of a pointer bit and said one or more output bits, wherein said pointer bit is associated with said input bit of said step b); and
   d) embedding said sequence of bits selected into encoded digital data by modifying coefficients of said encoded digital data according to said sequence of bits selected, wherein each bit of said sequence of bits selected is used to modify a respective coefficient of said encoded digital data, wherein said respective coefficient is incremented by not more than a value of one such that said respective coefficient is made even when said bit has a first value and odd when said bit has a second value, and wherein information so embedded is hidden.

2. The method for encoding and embedding information within digital data as recited in claim 1 wherein said digital data are in a compressed format.

3. The method for encoding and embedding information within digital data as recited in claim 1 wherein said step c) further comprises the steps of:
   c1) using said output bit to select a subgroup from a plurality of subgroups comprising a plurality of sequences of bits; and
   c2) using said pointer bit to select said sequence of bits selected from said plurality of said sequences of bits.

4. The method for encoding and embedding information within digital data as recited in claim 3 wherein said plurality of subgroups comprises four subgroups each comprising two sequences of bits each comprising three bits.

5. The method for encoding and embedding information within digital data as recited in claim 1 further comprising the steps of:

e) reading said coefficients of said encoded digital data to retrieve said sequence of bits; and f) decoding said sequence of bits using said convolutional code.

6. A computer system comprising:

a bus;

a processor coupled to said bus; and a computer-readable memory unit coupled to said bus;

said processor for performing a method for encoding and embedding information within digital data, said method comprising the steps of:

a) separating a plurality of bits representing information to be embedded into a first group of input bits and a second group of pointer bits according to a predetermined scheme, wherein each pointer bit in said second group is associated with a respective input bit in said first group;

b) generating one or more output bits from an input bit using a convolutional code;

c) selecting a sequence of bits using a combination of a pointer bit and said one or more output bits, wherein said pointer bit is associated with said input bit of said step b); and d) embedding said sequence of bits selected into encoded digital data by modifying coefficients of said encoded digital data according to said sequence of bits selected, wherein each bit of said sequence of bits selected is used to modify a respective coefficient of said encoded digital data, wherein said respective coefficient is incremented by not more than a value of one such that said respective coefficient is made even when said bit has a first value and odd when said bit has a second value, and wherein information so embedded is hidden.

7. The computer system of claim 6 wherein said digital data are in a compressed format.

8. The computer system of claim 6 wherein said processor performs said method for encoding and embedding information within digital data wherein said step c) further comprises the steps of:

c1) using said output bit to select a subgroup from a plurality of subgroups comprising a plurality of sequences of bits; and c2) using said pointer bit to select said sequence of bits selected from said plurality of said sequences of bits.

9. The computer system of claim 8 wherein said plurality of subgroups comprises four subgroups each comprising two sequences of bits each comprising three bits.

10. The computer system of claim 6 wherein said processor performs said method for encoding and embedding information within digital data further comprising the steps of:

e) reading said coefficients of said encoded digital data to retrieve said sequence of bits; and f) decoding said sequence of bits using said convolutional code.

11. A digital camera system for encoding and embedding information within digital data, said digital camera system comprising:

encoding means for separating a plurality of bits representing information to be embedded into a first group of input bits and a second group of pointer bits according to a predetermined scheme, wherein each pointer bit in said second group is associated with a respective input bit in said first group;

said encoding means also for generating one or more output bits from an input bit using a convolutional code;

said encoding means also for selecting a sequence of bits using a combination of a pointer bit and said one or more output bits, wherein said pointer bit is associated with said input bit used to generate said one or more output bits; and modulating means for embedding said sequence of bits selected into encoded digital data by modifying coefficients of said encoded digital data according to said sequence of bits selected, wherein each bit of said sequence of bits selected is used to modify a respective coefficient of said encoded digital data, wherein said respective coefficient is incremented by not more than a value of one such that said respective coefficient is made even when said bit has a first value and odd when said bit has a second value, and wherein information so embedded is hidden.

12. The digital camera system for encoding and embedding information within digital data as described in claim 11 wherein said digital data are in a compressed format.

13. The digital camera system for encoding and embedding information within digital data as described in claim 11 wherein said digital data are image data.

14. The digital camera system for encoding and embedding information within digital data as described in claim 12 wherein said information is an alpha-numeric description related to said image data.

15. The digital camera system for encoding and embedding information within digital data as described in claim 11 further comprising:

decoder means for reading said coefficients of said encoded digital data and retrieving said sequence of bits;

said decoder means also for decoding said sequence of bits using said convolutional code.

* * * * *